United States Patent [19]
Blincow

[11] 3,919,551
[45] Nov. 11, 1975

[54] APPARATUS FOR MEASUREMENT OF TREE CORE DENSITY

[75] Inventor: Donald W. Blincow, Claremont, Calif.

[73] Assignee: Tyco Laboratories, Inc., Pomona, Calif.

[22] Filed: Mar. 14, 1974

[21] Appl. No.: 451,157

[52] U.S. Cl. .............................. 250/358; 250/359
[51] Int. Cl.² ...................................... G01N 23/06
[58] Field of Search .......... 250/252, 255, 358, 359, 250/360, 304

[56] References Cited
UNITED STATES PATENTS

| | | | |
|---|---|---|---|
| 2,301,251 | 11/1942 | Capen | 250/360 |
| 3,056,026 | 9/1962 | Bigelow | 260/359 |
| 3,080,479 | 3/1963 | Berg et al. | 250/360 |
| 3,136,892 | 6/1964 | Willett et al. | 250/360 |
| 3,240,940 | 3/1966 | Dukes et al. | 250/359 |

Primary Examiner—Archie R. Borchelt
Attorney, Agent, or Firm—Harris, Kern, Wallen & Tinsley

[57] ABSTRACT

Apparatus for direct measurement of density of a core sample from a tree. A radiation source and detector with a receptacle for the core therebetween, an integrator unit for the detector output, and an indicating meter driven by the integrator unit.

6 Claims, 7 Drawing Figures

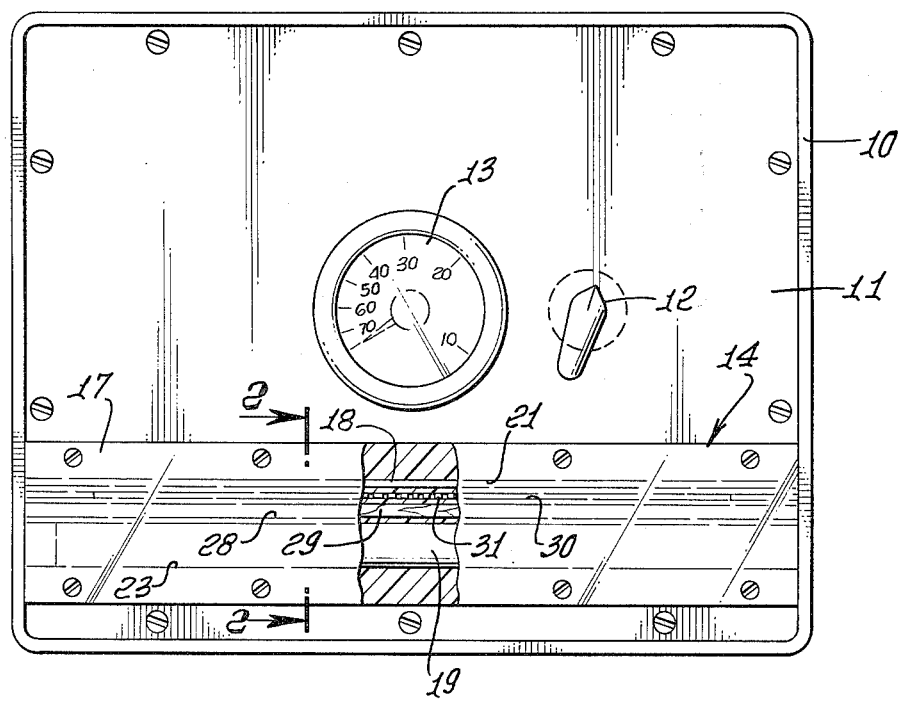
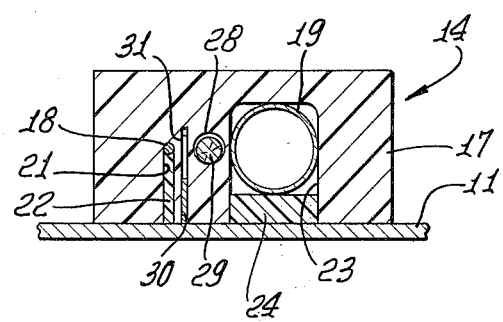
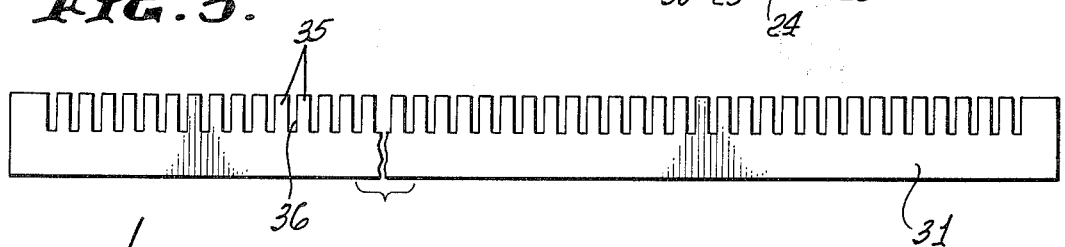
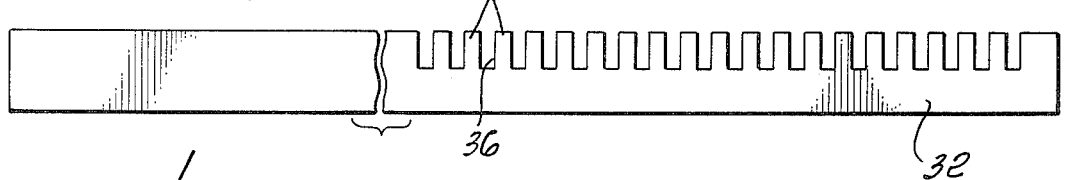
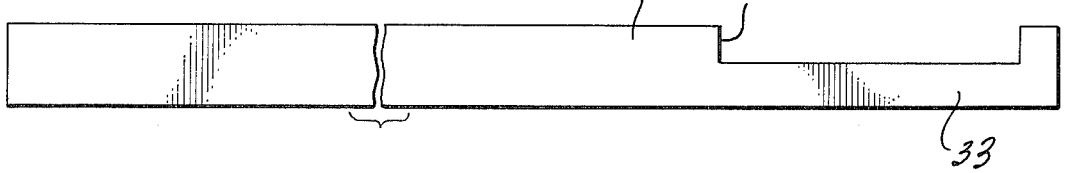

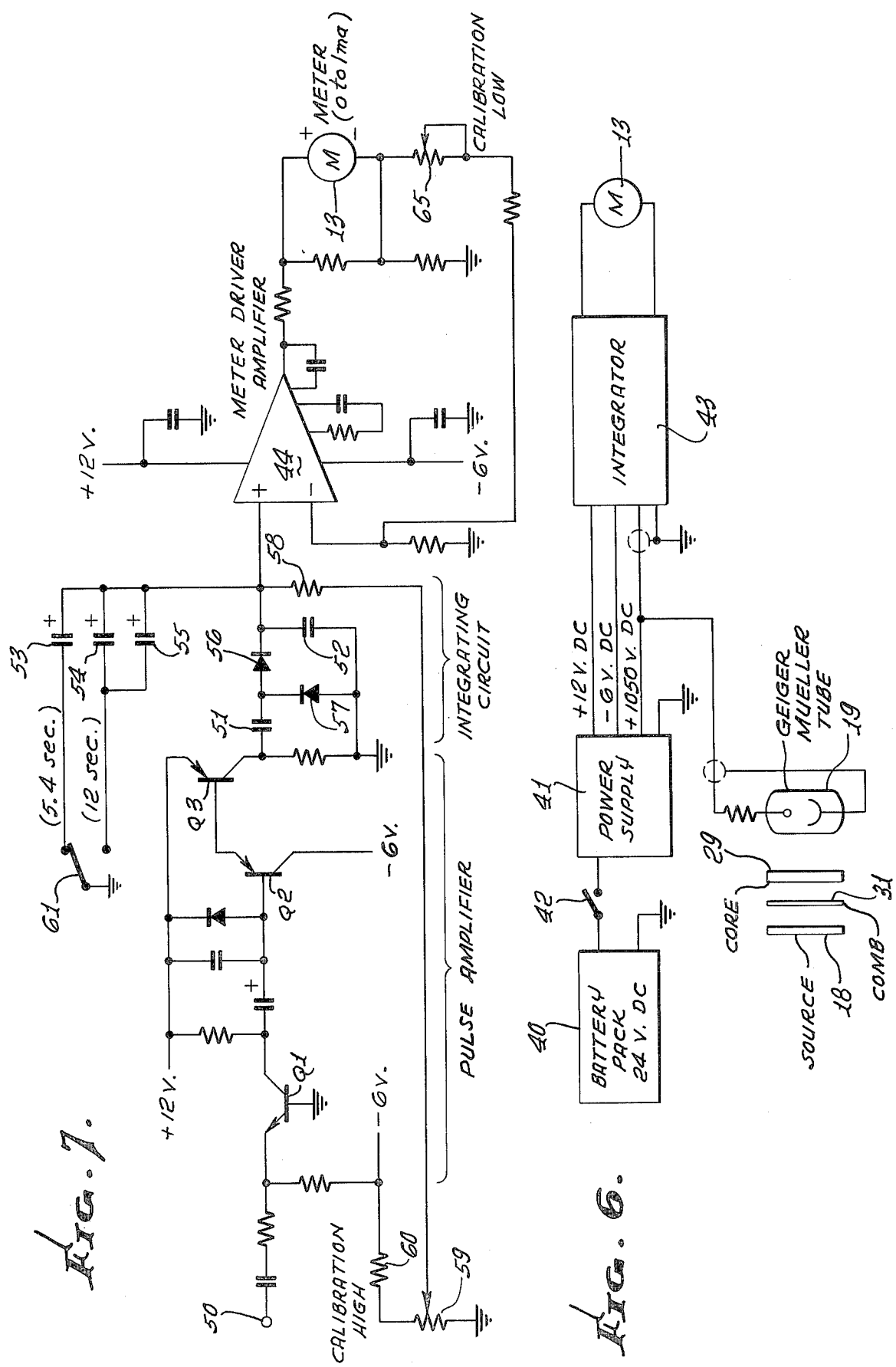

APPARATUS FOR MEASUREMENT OF TREE CORE DENSITY

This invention relates to the measurement of density of samples, such as the conventional core samples obtained from logs and living trees.

In lumbering operations, it is desired to know the weight of logs and living trees. This has been done by a determination of various parameters of the log, including the density of a core obtained with the conventional coring tool. The density together with other parameters including log diameter, sap wood to heart wood ratio, average bark thickness and the like are used by the logger to obtain an estimate of log weight.

In the past, it has been the practice to determine the density of the core by measuring and weighing the core, and this operation is ordinarily performed at a small laboratory building somewhere in the logging area. Inaccuracies arise in the density measurement because the core samples lose or gain moisture quite rapidly when removed from the tree, either by losing water in dry weather and/or high altitude, or by gaining water in wet weather, during the time interval in which the core is transported to the measuring site and during the time of the actual measuring operation.

Accordingly, it is an object of the present invention to provide a new and improved core density measuring apparatus which is fast and easy to operate and which can utilized immediately on the spot the core is obtained.

The instrument of the invention is not limited to use with tree cores and is also suitable for the measurement of density of other materials such as plastics and porous rock.

It has been determined that the density of a core is a function of the radiation absorbtion of the core. The tree core density measuring apparatus of the present invention includes a radiation source and a radiation detector with means for positioning the core therebetween, and an integrator unit and indicator meter for converting the detector output to a meter indication which can be read directly in density, such as pounds per cubic foot.

Other objects, advantages, features and results will more fully appear in the course of the following description. The drawings merely show and the description merely describes a preferred embodiment of the present invention which is given by way of illustration or example.

In the drawings:

FIG. 1 is a top view of a core density measuring instrument incorporating the presently preferred embodiment of the invention;

FIG. 2 is a partial enlarged sectional view taken the line 2—2 of FIG. 1;

FIGS. 3, 4 and 5 illustrate radiation shields for the instrument of FIGS. 1 and 2 for use with various lengths of core;

FIG. 6 is a block diagram of the electrical circuit of the instrument of FIG. 1; and FIG. 7 is a schematic of the integrator of FIG. 6.

The density measuring instrument is mounted in a housing 10 with a top panel 11 carrying a control switch 12, an indicating meter 13, and a radiation unit 14.

The radiation unit is shown in greater detail in FIG. 2 and typically comprises a plastic block 17 with a radiation source 18 and a radiation detector 19 mounted therein. The source 18 preferably is a rod impregnated with a radioactive material, such as strontium 90. The rod may be positioned in the block 17 at the bottom of a groove 21. The groove 21 is then filled with a plug 22. The radiation detector 19, typically a Geiger-Mueller tube, is positioned in another groove 23, which may be closed by another plug 24. A circular passage 28 is provided in the block 17 between the source and detector for receiving the sample core 29. Another slot 30 may be provided in the block 17 between the source 18 and the core passage 28, for receiving a radiation shield, such as one of the shields 31, 32, 33 shown in FIGS. 3, 4, 5, respectively. The typical tree coring tool produces a core 8 inches long and in the range of 0.15 to 0.20 inches diameter. The embodiment of the core density measuring instrument illustrated herein is designed for handling cores of several lengths without requiring different meter scales or changes of calibration. This is accomplished by utilizing the radiation shields 31, 32, 33 with the shield 31 designed for an 8 inch core, the shield 32 for a 4 inch core and shield 33 for a 2 inch core. The shield 31 is comb shaped with teeth or radiation absorbers 35 separated by radiation passages 36. In the shield 31, the absorbers and passages extend for 8 inches, while in the shield 32 they extend for 4 inches. In the shield 33, there is a single passage 36 which is 2 inches long. However, the total length of the passages is the same in each of the shields so that the radiation passing from the source to the core space is the same regardless of which shield is inserted into the block 17.

The electrical circuitry for the instrument is contained in the housing 10 below the panel 11. The embodiment illustrated is designed to be battery operated and portable, suitable for use at the side of the log from which a core is taken. A battery pack 40 is connected to a power supply 41 through a section 42 of the switch 12. The power supply may be conventional in design and provides three outputs to an integrator unit 43 and a high voltage supply to the radiation detector 19.

The integrator unit 43 is shown in greater detail in FIG. 7 and includes a pulse amplifier with transistors Q1, Q2 and Q3, an integrating circuit, and a meter driver amplifier with an operational amplifier 44 which may be a A709.

The previously mentioned strontium 90 radiation source emits beta particles with energy and range well suited to the conventional core diameters and wood densities encountered, the densities typically being in the range of 10 to 80 pounds per cubic foot. Other radiation sources, such as tritium, carbon 14 and PU 238 can be used. The source desirably has a uniform flux output over the operating length, such as the 8 inch length of the embodiment illustrated.

The radiation detector desirably has a low absorbtion entrance window. The previously mentioned thin walled Geiger Mueller tube or an ion chamber or proportional counter with a mica or berylium window are suitable. The detector desirably has a uniform response over the length of the sample, and the source and detector should be accurately positioned in parallel to provide equal sensitivity along the length of the core.

The radiation is absorbed exponentially by the sample, with the detector response in counts per second being a logarithmic function of the density. When this relationship is plotted on semilog paper with the count rate on the logrithmic scale, the response curve is a straight line.

In operation, a radiation shield corresponding to the length of the core to be tested is inserted into the groove 30 and the instrument is turned on. The core to be analyzed is removed from the coring tool and immediately inserted into the core space 28, and in a few seconds the density is indicated by the meter 13.

The core absorbs a portion of the radiation from the source, with the remainder arriving at the detector. The integrator unit converts the pulse output from the detector into a direct current signal for driving the meter 13. The detector is connected to the integrator at input terminal 50, which is the input to the pulse amplifier. The pulse amplifier output is a square pulse 12 volts in amplitude. The pulse output from the pulse amplifier is transformed into a dc voltage proportional to the pulse rate by the integrating circuit, which comprises capacitors 51, 52 and either 53 (short time constant) or 54 and 55 (long time constant), diodes 56, 57, and resistors 58, 59 and 60. Switch section 61 provides a choice of time constants for the integrating circuit. The dc voltage output of the integrating circuit is amplified in the meter driver amplifier for actuating the meter 13.

Resistor 65 is a potentiometer utilized for adjusting the gain of the amplifier 44 to provide a near full scale deflection of the meter at the maximum count rate. A suitable low density calibration core may be a sealed plastic foam rod which may have a density equivalent of say 14 pounds per cubic foot.

The resistor 59 is another potentiometer provided for high density calibration, and is used to offset the low count rate input from the detector. A high density calibration core of known density equivalent is positioned in the core space and the potentiometer 59 is adjusted to provide the desired meter indication. A lucite rod is suitable for use as the high calibration core, having a density equivalent to 78.5 pounds per cubic foot. The current into the meter 13 is linear with detector count rate and, since the count rate is a logrithmic function of wood density, the meter is provided with a logarithmic scale from 10 to 80 pounds per cubic foot.

The particular radiation shields 31, 32, 33 illustrated in FIGS. 3, 4 and 5 absorb three-quarters of the source emission and allow one-quarter of the radiation to pass, without attenuation, into the core space. Thus with a change of shields, the user can measure the average density of three different lengths of cores, or of different length sections along a single core, without recalibration or loss of accuracy.

I claim:

1. In an apparatus for measuring density of an elongate thin core of substantially uniform cross section area, the combination of:
    a radiation source in the form of a rod providing a substantially uniform flux along the length thereof;
    a radiation detector in the form of a tube providing a substantially uniform response along the length thereof;
    means for mounting said source and detector in parallel spaced relation and defining a core receiving space therebetween with said source and detector positioned so that the entire cross section of the core is in the radiation path from said source to said detector; and
    an integrator unit having the output of said detector as an input and providing an output varying as a function of the average density of the entire cross section of a core positioned in said space.

2. An apparatus as defined in claim 1 wherein said integrator unit provides an output varying substantially as a linear function of the count rate of said detector, and including
    an indicator having the integrator unit output as an input and calibrated for direct reading in density.

3. An apparatus as defined in claim 1 wherein said integrator unit includes a pulse amplifier, an integrating circuit and an indicator driver amplifier.

4. An apparatus as defined in claim 1 wherein said mounting means defines a radiation shield space between said source and core space, and
    a plurality of radiation shields for positioning in said shield space, said shields having radiation passages and radiation absorbers disposed along the lengths thereof, with the passages of a size permitting the entire cross section of the core in said radiation path, and
    with the passages of each of said shields having substantially the same total lengths for providing substantially the same radiation of the core with each shield, and with the passages of different shields occupying different overall lengths for use with different lengths of cores.

5. An apparatus as defined in claim 4 including a radiation shield wherein said absorbers comprise a plurality of equally spaced teeth.

6. An apparatus as defined in claim 2 including:
    high density and low density calibration potentiometers in said integrator unit;
    a first calibration rod for said core receiving space and having a known radiation absorbtion equivalent to a high density core; and
    a second calibration rod for said core receiving space and having a known radiation absorbtion equivalent to a low density core.

* * * * *